April 5, 1955 V. COFER 2,705,393
POWER MOWER
Filed July 3, 1953 2 Sheets-Sheet 1

INVENTOR.
VIRGIL COFER
BY
McMorrow, Berman & Davidson
ATTORNEYS

April 5, 1955      V. COFER      2,705,393
POWER MOWER
Filed July 3, 1953      2 Sheets-Sheet 2
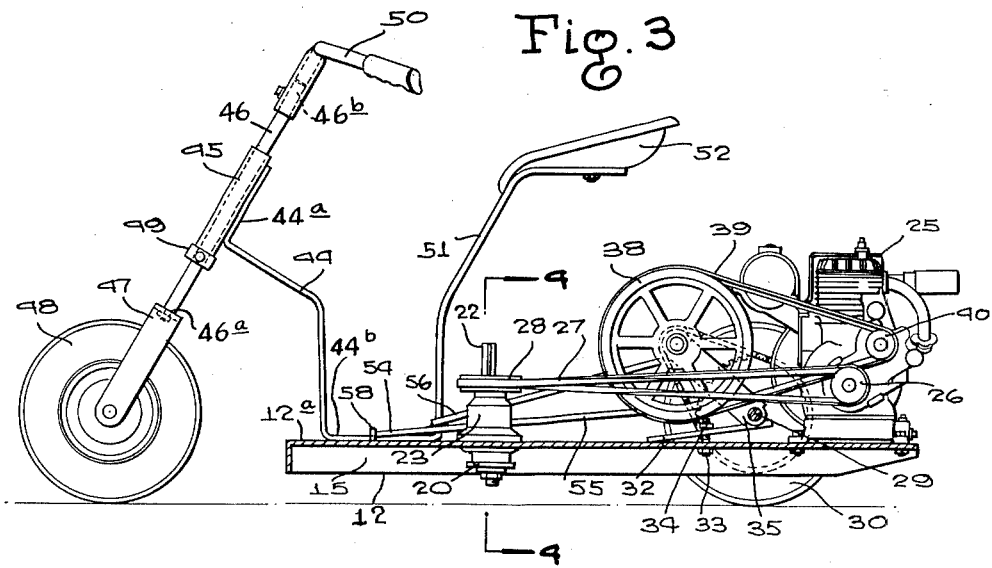
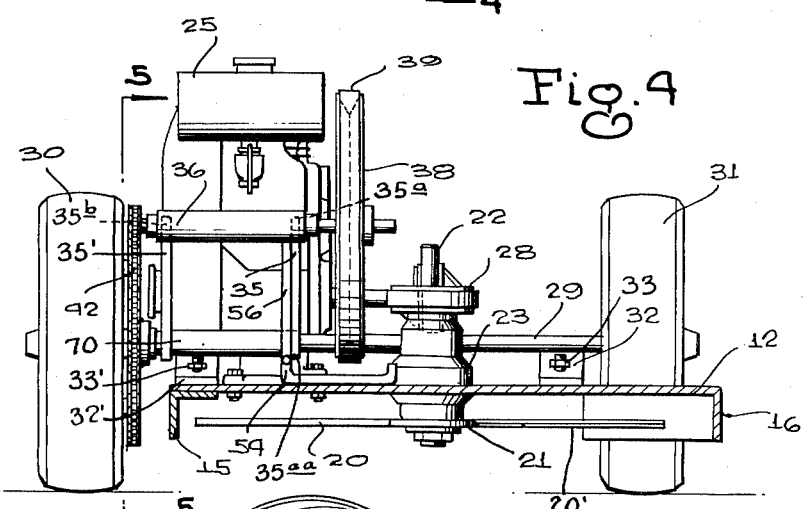
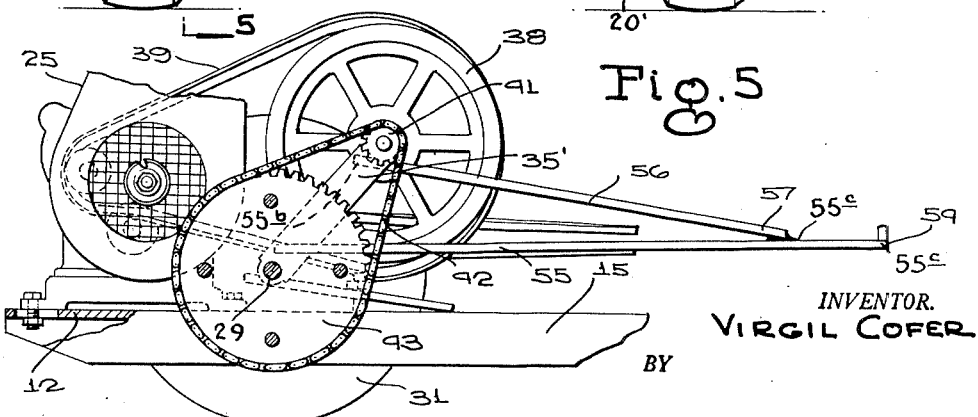
INVENTOR.
VIRGIL COFER
BY
McMorrow, Berman & Davidson
ATTORNEYS

United States Patent Office 2,705,393
Patented Apr. 5, 1955

2,705,393
POWER MOWER
Virgil Cofer, Ransom, Kans.

Application July 3, 1953, Serial No. 365,885

3 Claims. (Cl. 56—25.4)

This invention relates to power lawn mowers, and more particularly to an improved power mower of the type having a horizontal rotating cutting blade.

A main object of the invention is to provide a novel and improved power mower which is simple in construction, which is easy to operate, and which enables the operator to ride on the mower with improved safety and comfort.

A further object of the invention is to provide an improved power lawn mower of the type having a horizontal rotating cutting blade, said power mower involving inexpensive components, being rugged in construction, being compact in size, and being safe to use.

Further objects and advantages of the invention will become apparent from the following description and claims, and from the accompanying drawings, wherein:

Figure 3 is a longitudinal vertical cross sectional view taken on the line 3—3 of Figure 2.

Figure 4 is an enlarged transverse vertical cross sectional view taken on the line 4—4 of Figure 3.

Figure 5 is an enlarged vertical cross sectional detail view taken on the line 5—5 of Figure 4.

Figure 1:
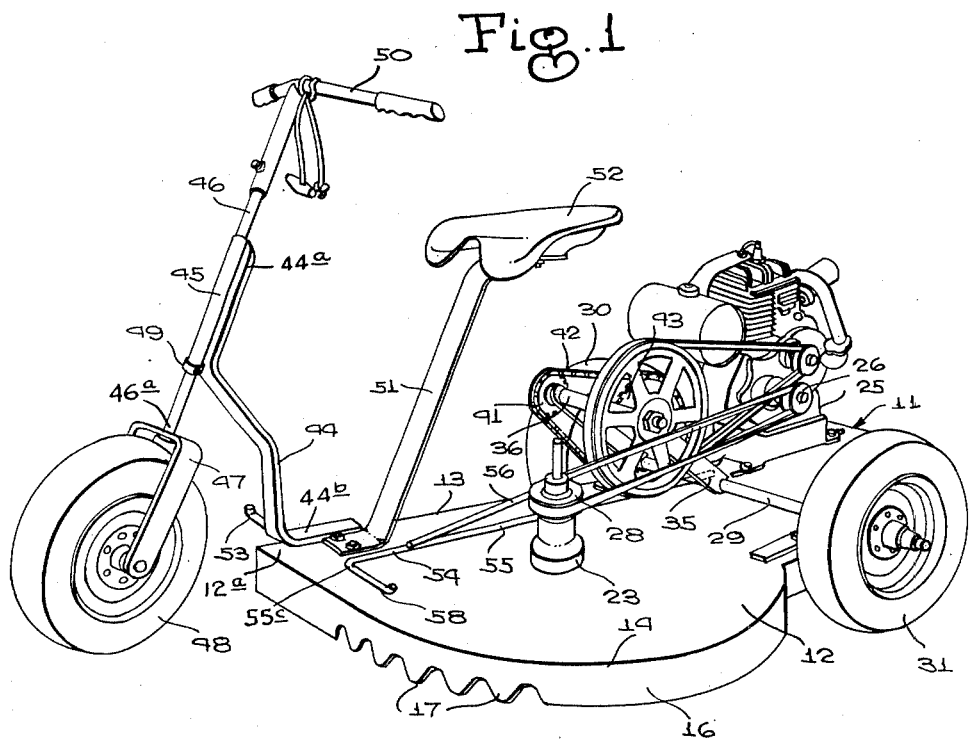
Figure 1 is a perspective view of an improved power lawn mower constructed in accordance with the present invention.
Figure 2:
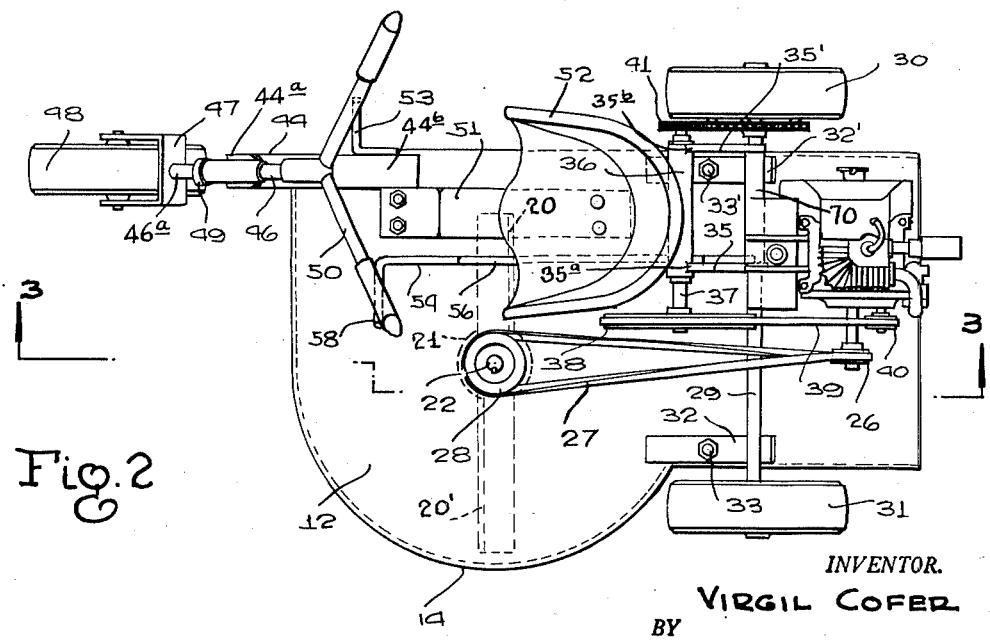
Figure 2 is a top plan view of the power lawn mower of Figure 1.

Referring to the drawings, the improved power mower is designated generally at 11. The mower 11 comprises a horizontal supporting plate or platform 12 having one straight edge 13 and having the generally arcuate opposite edge 14, the edges of the plate 12 being provided with a flange or depending peripheral flange elements 15 and 16. As shown, the flange 15 depends from the edge 13 whereas the flange 16 depends from the curved edge 14, the flanges 15 and 16 merging and providing a continuously depending guard flange for the supporting plate 12. As shown in Figure 1, the curved flange 16 is formed with the arcuately curved serrations 17 at its forward portion which form a rake defining clearance space for grass to be mowed as the machine moves forwardly.

Horizontally disposed cutting means is positioned underneath the platform 12 intermediate the straight edge 13 and the arcuate edge 14 or depending flange, and is rotatable about a vertical axis. Specifically, designated at 20, 20' are respective, oppositely arranged horizontal cutting blades which are secured integrally to a common ring portion 21 which is secured on a vertical axis or spindle 22 journaled in a vertical bearing assembly 23 on the supporting plate 12. As shown in Figures 3 and 4, the blades 20, 20' are positioned beneath the supporting plate 12 and within the space defined by the depending flange elements 15 and 16 of said plate.

Designated at 25 is a gasoline engine which is mounted on the rear portion of the supporting plate 12 and which has a first output pulley 26 coupled by a belt 27 to a pulley 28 secured on the spindle 22.

Designated at 29 is a transversely extending axle member which extends over the rear portion of the supporting plate 12 and which has the main drive wheels 30 and 31 journaled on its opposite ends. Rigidly secured to one end portion of the axle 29 is a forwardly extending bar member 32 and to a sleeve 70 carried by the opposite end portion of the axle 29 is a forwardly extending bar member 32', said bar members being adjustably secured to the supporting plate 12 by respective bolts 33, 33' extending through the intermediate portions of the bar members and through said supporting plate, the bolts being provided with suitable fastening nuts 34 which may be adjusted on the bolts to vary the angular relationship of the bar members 32, 32' relative to the supporting plate 12. By the thus described structure the main drive wheels 30 and 31 support the rear end of the platform 12. As is clearly apparent from Figure 3, the forward end of the bar members 32, 32' pivotally engage the top surface of the supporting plate 12, and by tightening the nuts 34, the bar members 32, 32' may be rotated downwardly to lower the axle 29 relative to the supporting plate 12, or in other words, the rear end of the platform 12 is supported from the main wheels 30 and 31 for upward and downward movement.

Rigidly secured to the sleeve 70 carried by the axle 29 adjacent the ground-engaging wheel 30 are the arms 35, 35' which are integrally connected at their ends 35a, 35b, to a transversely extending sleeve member 36, the arms 35, 35' extending forwardly and upwardly from the axle 29, whereby the sleeve member 36 is supported in an elevated and forwardly arranged position parallel to the axle 29. Journaled in the sleeve 36 is the transverse shaft 37 having secured to one end thereof the relatively large pulley 38 which is coupled by a belt 39 to a second drive pulley 40 provided on the gasoline engine 25. It will be understood that the drive pulleys 26 and 40 are both driven simultaneously by the engine and that the engine itself is of conventional construction.

Secured to the end of shaft 37 adjacent the ground-engaging wheel 30 is a small sprocket wheel 41 which is coupled by a chain 42 to a relatively large sprocket wheel 43 carried by the wheel 30. Thus, the wheel 30 is drivingly connected to the output pulley 40 of the engine, providing propulsion for the machine in a forward direction.

Secured to the forward end portion 12a of the supporting plate 12 adjacent the straight side edge 13 is the lower end portion 44b of forwardly and upwardly extending swivel bracket bar 44 which is provided at its upper portion 44a with the inclined swivel sleeve 45. Extending rotatably through the swivel sleeve 45 is the steering shaft 46 which has secured to its lower end 46a the yoke 47 in which is journaled the front ground-engaging wheel 48, the shaft 46 being provided with a collar 49 on which the sleeve 45 is rotatably supported relative to said shaft. Secured to the top portion 46b of the steering shaft 46 is the conventional handle bar assembly 50 which is employed in the usual manner to steer the machine. The thus described structure constitutes a steerable wheel assembly which supports the front end of the platform and which is disposed between the drive wheels 30 and 31 and adjacent to the straight edge 13 of the platform 12 and the drive wheel 30, the latter wheel being parallel to and spaced from the straight edge 13 of the platform 12.

Secured to the forward portion of the supporting plate 12 adjacent the swivel bracket 44 is the upwardly and rearwardly inclined seat bracket bar 51 to the top end of which is secured the driver's seat 52. Secured to the side marginal portion of the supporting plate 12 adjacent the swivel bracket 44 and projecting laterally from the longitudinal edge 13 of said supporting plate is a first L-shaped foot rest bar 53. Designated at 54 is a longitudinally extending clutch bar which comprises a first rod 55 rigidly connected, as by welding or the like, to the lower portion 35aa of the arm 35 and a second rod 56 which is welded at 57 to the forward portion 55a of the rod 55 and which is welded at its rear end portion 55b to the upper portion 35a of the aforesaid arm 35. The forward end 55c of the rod 55 is formed with the outwardly projecting transverse pedal element 58 which is engageable by the operator's foot. When the clutch member 54 is in its elevated position, as shown in Figure 5, the tension on the belt 39 is relaxed and the traction wheel 30 is not driven. However, when the operator exerts downward foot pressure on the pedal 58, causing the clutch member 54 to be rotated downwardly, the arms 35, 35' are rotated clockwise, as viewed in Figure 5, whereby the belt 39 is tightened, and whereby the traction wheel 30 becomes drivingly connected to the output pulley of the engine 25.

It will be readily understood that since the supporting plate 12 may be adjusted vertically relative to the ground by means of the adjusting nuts 34, the height of cut of the blades 20, 20' may be accordingly adjusted, as desired by the operator.

In operation, the user occupies the seat 52 and guides the machine by means of the steering bar assembly 50. By depressing the foot pedal element 58, traction is furnished by the rear wheel 30, whereby the machine is moved forwardly over its desired course of travel.

The novel drive means above described is suitable for use on other self-powered equipment, such as on power wheelbarrows and the like.

An important advantage of applicant's improved power lawn mower above described is that, since the front wheel 48 and rear wheel 30 are laterally offset from the path of the rotating cutter blades, the mower does not run over any uncut grass with its wheels, since the front wheel 48 and rear wheel 30 will travel on grass previously cut by the mower and the rear wheel 31 is behind the rotating cutter blades.

While a specific embodiment of an improved power lawn mower has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A power lawn mower comprising a horizontally disposed platform having a straight edge and a generally arcuate opposite edge, a pair of main drive wheels arranged in spaced relation positioned adjacent to and supporting the rear end of said platform, one of said drive wheels being parallel to and spaced from the straight edge of said platform, a steerable wheel assembly supporting the front end of said platform, said wheel assembly being disposed between said main drive wheels and adjacent to the straight edge of said platform and said one drive wheel, horizontally disposed cutting means disposed underneath said platform intermediate the straight and arcuate edges thereof and rotatable about a vertical axis, power means for driving said drive wheels, a clutch bar positioned above said platform and having one end operatively connected to said power means and having the other end provided with a pedal, said clutch bar upon application of downward pressure upon said pedal drivingly connecting said power means to said drive wheels and upon release of such pressure breaking the driving connection of said power means to said drive wheels, and means connecting said cutting means axis to said power means.

2. A power lawn mower comprising a horizontally disposed platform having a straight edge and a generally arcuate opposite edge, a flange depending from the straight and arcuate edges of said platform, the portion of said flange depending from the arcuate edge of said platform contiguous to said wheel assembly being provided with serrations and forming a rake, a pair of main drive wheels arranged in spaced relation positioned adjacent to and supporting the rear end of said platform, one of said drive wheels being parallel to and spaced from the straight edge of said platform, a steerable wheel assembly supporting the front end of said platform, said wheel assembly being disposed between said main drive wheels and adjacent to the straight edge of said platform and said one drive wheel, horizontally disposed cutting means disposed underneath said platform said flange and rotatable about a vertical axis, power means for driving said drive wheels, a clutch bar positioned above said platform and having one end operatively connected to said power means and having the other end provided with a pedal, said clutch bar upon application of downward pressure upon said pedal drivingly connecting said power means to said drive wheels and upon release of such pressure breaking the driving connection of said power means to said drive wheels, and means connecting said cutting means axis to said power means.

3. A power lawn mower comprising a horizontally disposed platform having a straight edge and a generally arcuate opposite edge, a pair of main drive wheels arranged in spaced relation positioned adjacent to the rear end of said platform, said rear end of said platform being supported from said wheels for upward and downward movement, one of said drive wheels being parallel to and spaced from the straight edge of said platform, a steerable wheel assembly supporting the front end of said platform, said wheel assembly being disposed between said main drive wheels and adjacent to the straight edge of said platform and said one drive wheel, horizontally disposed cutting means disposed underneath said platform intermediate the straight and arcuate edges thereof and rotatable about a vertical axis, power means for driving said drive wheels, a clutch bar positioned above said platform and having one end operatively connected to said power means and having the other end provided with a pedal, said clutch bar upon application of downward pressure upon said pedal drivingly connecting said power means to said drive wheels and upon release of such pressure breaking the driving connection of said power means to said drive wheels, and means connecting said cutting means axis to said power means.

References Cited in the file of this patent

UNITED STATES PATENTS

| | | |
|---|---|---|
| 2,143,057 | Danielson | Jan. 10, 1939 |
| 2,220,705 | Burckes | Nov. 5, 1940 |
| 2,263,368 | Sejkora | Nov. 18, 1941 |
| 2,285,230 | Roberton | June 2, 1942 |
| 2,620,612 | DeEugenio | Dec. 9, 1952 |
| 2,691,263 | Wegele | Oct. 12, 1954 |